United States Patent [19]

Olson

[11] Patent Number: 5,131,632

[45] Date of Patent: Jul. 21, 1992

[54] QUICK COUPLING PIPE CONNECTING STRUCTURE WITH BODY-TAPERED SLEEVE

[76] Inventor: Darwin B. Olson, Rte. 2, Box 287, Stanchfield, Minn. 55080

[21] Appl. No.: 783,199

[22] Filed: Oct. 28, 1991

[51] Int. Cl.⁵ .............................................. F16L 21/00
[52] U.S. Cl. ................................... 285/382; 285/373; 285/419; 285/322; 285/421
[58] Field of Search ............... 285/382, 373, 419, 322, 285/421

[56] References Cited

U.S. PATENT DOCUMENTS

| | | | |
|---|---|---|---|
| 591,828 | 10/1897 | Duncan | 285/373 X |
| 733,995 | 7/1903 | Günster | 285/373 |
| 969,943 | 9/1910 | Cronholm | 285/383 X |
| 1,184,273 | 5/1916 | Terry et al. | 285/322 X |
| 1,590,908 | 6/1925 | Riles | 285/373 X |
| 2,739,018 | 3/1956 | Collett | 285/419 X |
| 4,103,943 | 8/1978 | Curtin | 285/419 |
| 4,159,132 | 6/1979 | Hitz | 285/373 X |
| 4,236,736 | 12/1980 | Anderson | 285/150 |

FOREIGN PATENT DOCUMENTS

| | | | |
|---|---|---|---|
| 1129876 | 1/1957 | France | 285/419 |
| 1434117 | 5/1976 | United Kingdom | 285/373 |

*Primary Examiner*—Randolph A. Reese
*Assistant Examiner*—Timothy Aberle
*Attorney, Agent, or Firm*—Leo Gregory

[57] ABSTRACT

A quickly attachable longitudinally split coupling structure to connect a pair of pipe ends for a leak proof connection, the coupling structure requiring only a tapping tool for installation or removal.

5 Claims, 2 Drawing Sheets

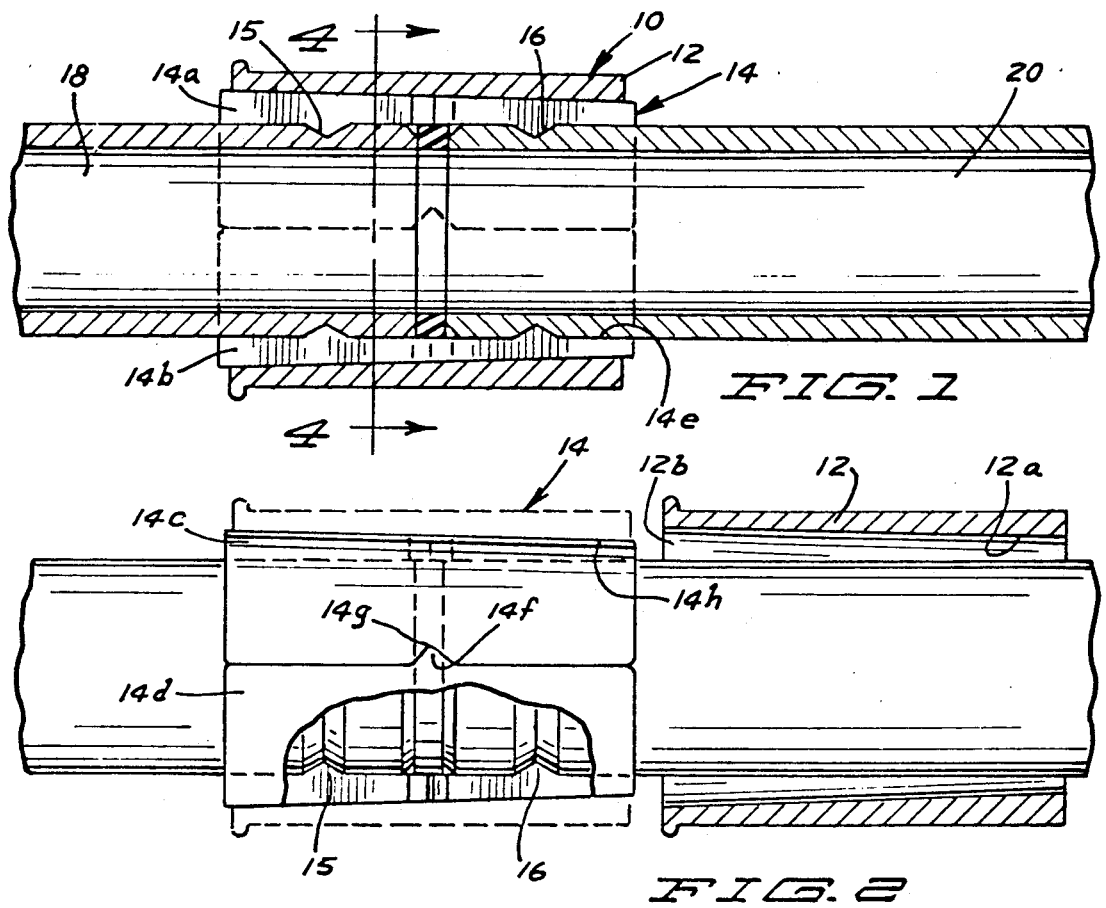
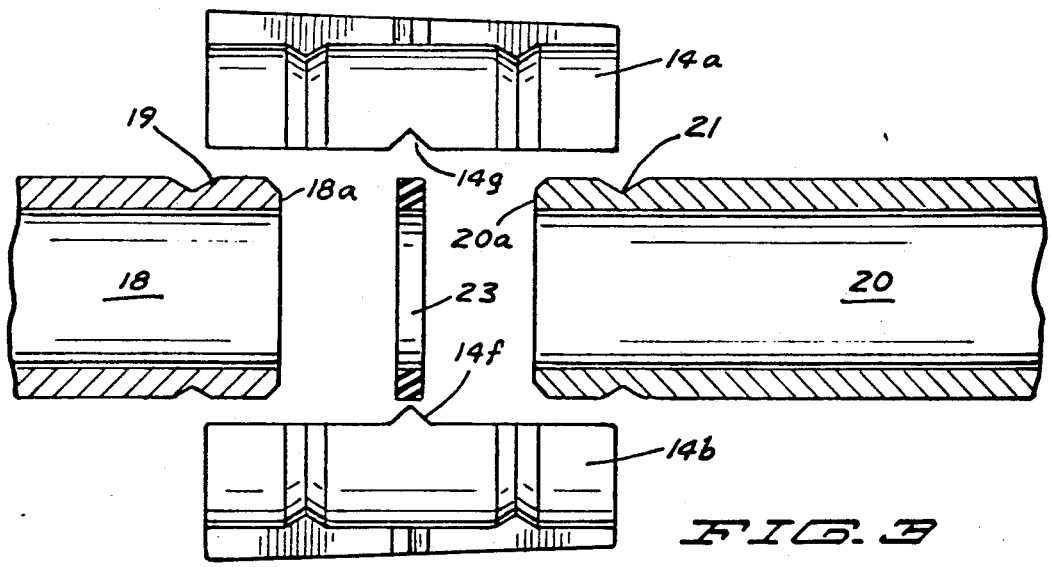

QUICK COUPLING PIPE CONNECTING STRUCTURE WITH BODY-TAPERED SLEEVE

BACKGROUND OF THE INVENTION

1. Field of Invention

This invention provides for a quick leak proof coupling of pipe ends.

2. Brief Description of the Prior Art

Pipe connectors in general consist of coupling pipe ends which are threaded by threaded coupling members which are tightened with a wrench.

Such a connection is easily accomplished where there is adequate space to provide for the use of a wrench, a radial clearance at least the length of the wrench used being required. Frequently there is not sufficient space necessary for a conventional connection and this situation gave rise to the invention herein.

SUMMARY OF THE INVENTION

Briefly, the quick connection structure comprising the invention herein consists of a longitudinally split coupling member and preferably it is split into three or four parts which intimately mate about adjacent pipe ends and are compressed thereabout and held in position by a sleeve member. The coupling member has an external taper and the sleeve member has a corresponding internal taper and receives and secures said coupling member.

To release the connection all that is required is a tapping of the sleeve for its removal. A washer may be inserted between the pipe ends to seal the same against leakage.

Thus the only space required is sufficient room to accommodate the operator's hands or perhaps just his fingers. A quick disconnect is made by a simple reverse tap of the coupling member.

The objects and advantages of the invention will be set forth in the following description made in connection with the accompanying drawings in which like reference characters refer to similar parts throughout the several views.

BRIEF DESCRIPTION OF THE DRAWINGS

FIG. 1 is a broken view in vertical longitudinal section;

FIG. 2 is an exploded view similar to that of FIG. 1 showing the position of a part in dotted line and having a portion thereof broken away;

FIG. 3 is a view partially in longitudinal vertical section and showing broken portions in separated related positions;

DESCRIPTION OF A PREFERRED EMBODIMENT

Figure 4:
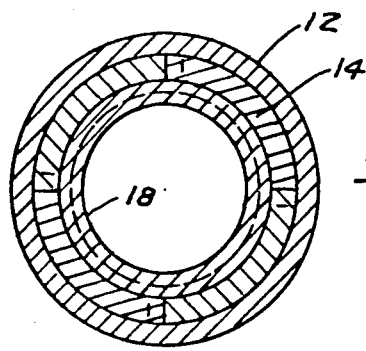
FIG. 4 is a view in vertical section taken on line 4—4 of FIG. 1 as indicated.

Referring to the drawings and more particularly to FIGS. 1-4, an embodiment of the invention herein comprising a pipe coupling structure is indicated generally by the reference numeral 10.

The coupling structure consists of an outer sleeve 12, to be later described, and an inner cylindrical member 14 on the order of a sleeve in assembled or operating condition and comprising a plurality of longitudinal radial sections which are here shown to be four in number, namely, 14a-d. Said sections in assembled condition have a tapered exterior diameter as indicated at 14e.

As indicated in FIGS. 2 and 3, each of said longitudinal sections has a midpoint side edge projection as at 14f which is parallel to the axis of said sections assembled and each of said sections has an opposed side edge notch 14g to receive said projection for an inter-engagement to correctly align said sections longitudinally of one another. Said sections will be treated hereafter as if in assembled condition.

Further, spaced from the midpoint of said projection of said assembled sections at each side thereof, are internal annular projections 15 and 16 forming internal beveled locking ribs and are shown here to be v-shaped in cross section.

Said sections may be of any desirable length and for practical purposes, it has been found that a length on the order of 1¾ inches to 2 inches is fully adequate.

The pipe lengths received and secured by said coupling structure 10 are here indicated as 18 and 20. These are commonly used conventionally sized pipes and the coupling structure is sized to accommodate such pipes.

In the embodiment shown here, said pipes have beveled machined ends 18a and 20a which seal upon contact. Spaced from each of said respective ends are external annular grooves 19 and 21 shown here to be v-shaped in cross section adapted to accommodate and have snugly fitted therein said annular internal projections or locking ribs 15 and 16 of said coupling structure.

If desired, as for greater assurance of a leak proof seal, a conventional annular compressible ring washer 23 is provided.

For an operational assembly of the longitudinal sections, two or three sections may be held in one hand about the end portion of one pipe length to be coupled, positioning, for example, the internal projection portions of the sections thus held to be mated with and received into the external annular groove of the pipe end held, pipe portion 18 for example, and the adjacent end portion of the other pipe length 20 is placed in the sections held abutting said seal or washer 23, if used, or directly engaging the adjacent end of the pipe length 18, if not used. Then the fourth section of the coupling structure is positioned to complete the cylindrical coupling structure enclosing the adjacent pipe lengths.

The assembly described is held in hand and the external or outer sleeve 12, which has been carried on the pipe length 20, is slid over said assembled sections. Said outer sleeve, to continue its description, has a tapered interior diameter 12a which at its larger opening end portion 12b easily slips over the tapered down end portion 14h of the assembled sections and gradually increases its engagement so that when fully positioned over the assembled sections as shown in FIGS. 1 and 2, it very tightly embraces the assembled longitudinal sections compressing the sections substantially equally about the enclosed pipe lengths 18 and 20 and thus makes a secure tight fitting leak proof seal.

As said sleeve is placed onto the assembled sections, the annular locking ribs of said sections upon seating into the annular grooves of the pipes cause the pipe ends to be more securely pressed together to make more positive the sealing effect.

Figure 5:
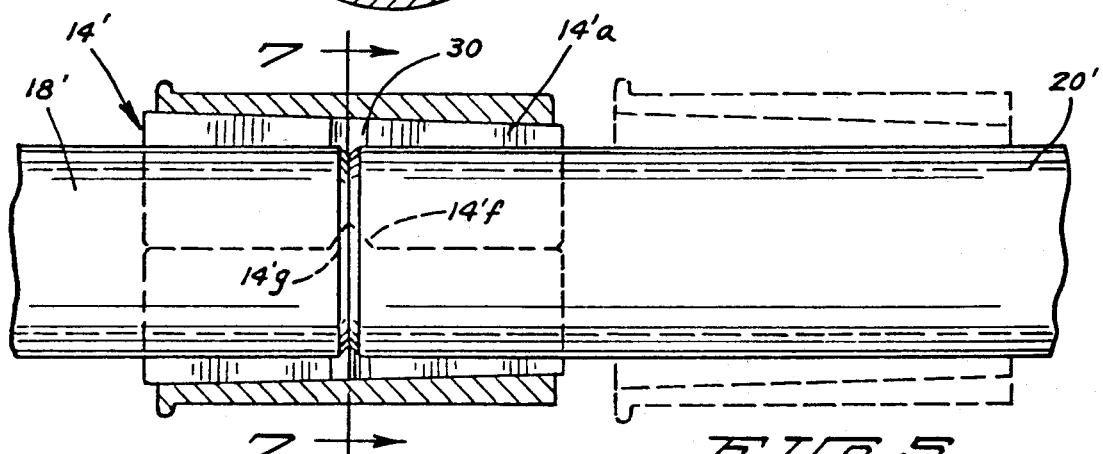
FIG. 5 is a view similar to that of FIG. 2 showing a modification.
Figure 6:
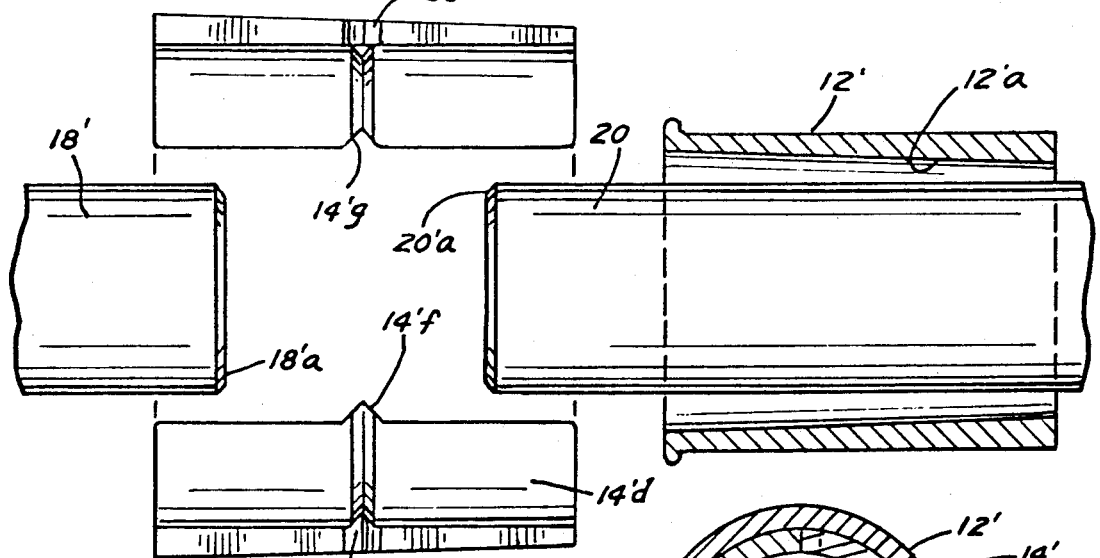
FIG. 6 is a view similar to that of FIG. 3 showing the modification.
Figure 7:
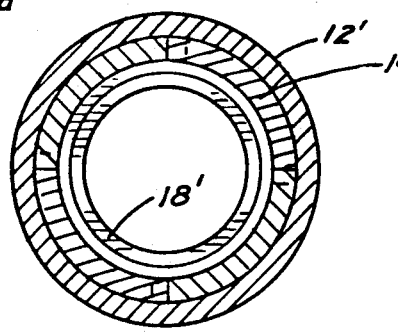
FIG. 7 is a view in vertical section taken on line 7—7 of FIG. 5 as indicated.

Reference is now had to a modified form of the structure herein as shown in FIGS. 5-7. Parts corresponding to like parts above described are indicated by like reference numerals with a prime added.

The inner cylinder 14' comprises, as here shown, four longitudinal radial sections 14'a-d, each of said sections having a smooth interior surface with the exception of an annular interior rib 30 of small height and width. This rib indicates the central longitudinal point of said sections 14'a-d.

Said rib 30 is of such a small dimension that the beveled ends 18'a and 20'a of the pipes 18' and 20', to be coupled, have seal tight physical engagement inwardly of said rib as indicated in FIG. 5.

Said sections 14'a-d as described in connection with the sections 14a-d have midpoint projections 14'f and corresponding notches 14'g as above described to provide a registration point so that said sections are correctly aligned longitudinally in being assembled.

The seal or washer 23 may be utilized in assembling the coupling structure for sealing purposes if desired and it will be of a diameter to fit within the interior of the centering rib 30.

As indicated in FIGS. 5 and 6, the sections 14'a-d as assembled will have a tapered exterior diameter 14'e.

A sleeve 12' corresponding to said sleeve 12 above described is previously positioned on one of the pipes to be coupled as indicated in dotted line in FIG. 5 and the same is slid over the assembled sections 14'a-d to lock the same in compression about the connected pipes 18' and 20'. The sleeve 12' has an interior taper 12'a corresponding to that of the sleeve 12.

Thus it is seen that I have provided a very easily and simply installed coupling structure to connect in leak proof engagement a pair of pipe lengths and these may be water pipes or simply conduits for containing electrical wires where the wiring is required to be enclosed.

Very little space is required for the assembly and installation of the coupling structure and whenever it may become necessary to cause a separation of a pair of connected pipes, the separation is easily accomplished.

As indicated, in the first form of the structure described, the connected pipes are required to be prepared with the annular grooves indicated. This represents a more positive coupling than is accomplished with the modified form in FIGS. 5-7.

It will of course be understood that various changes may be made in the form, details, arrangement and proportions of the product without departing from the scope of the invention which, generally stated, consists in a product capable of carrying out the objects above set forth, in the parts and combination of parts disclosed and defined in the appended claims.

What is claimed is:

1. A quick connecting leak proof pipe coupling structure, comprising
    a cylindrical member longitudinally radially split forming separable sections,
    each of said sections having a notch at one side edge thereof and a projecting tongue at the other side edge thereof,
    said notches and projecting tongues of said sections respectively interfitting to mate the respective adjacent edges of said sections in being disposed about adjacent smooth, annular end portions of a pair of abutting pipe ends,
    said separable sections in an assembled cylindrical condition having a full length tapered exterior diameter,
    a sleeve member having an interior full length diametrical taper slid over said assembled sections and about said pipe ends compressing said sections into a leak proof coupling structure.

2. The structure of claim 1, including
    an internal rib formed in each of said separable sections indicating the center point of the lengths of said sections.

3. A quick connecting leak proof pipe coupling member, comprising
    a cylindrical member being longitudinally radially split forming separable sections,
    said sections respectively having their adjacent edges interengage and mate in being disposed about abutting end portions of a pair of pipe lengths,
    each of said sections having a central annular projection at one side edge thereof,
    each of said sections having a notch at the other side edge thereof adapted to receive therein said projection of the adjacent edge of said section for interengagement,
    spaced from said central projection of said sections at each side thereof in assembled cylindrical condition are internal annular grooves,
    said pair of smooth annular pipe lengths having annular grooves spaced from their said abutting ends corresponding to said internal annular projections, said abutting pipe ends respectively being disposed into each end of said assembled sections, said annular grooves on said pipe ends respectively receiving said internal projections to be seated therein,
    said sections assembled having a full length tapered exterior diameter, and
    a cylindrical sleeve adapted to slide over said assembled sections and having an interior tapered diameter corresponding to said exterior tapered diameter of said assembled sections thereby embracing said assembled sections and compressing the same into a leak proof coupling structure.

4. The structure of claim 3, wherein
    said internal projections of said sections and said annular grooves of said pipe end being v-shaped in cross section.

5. The structure of claim 3, wherein
    said internal shoulder of said assembled sections and the respective annular grooves adjacent said pipe ends having the entry of said projections into said grooves cause the pipe ends to be pressed together endwise to increase the sealing effect of their abutting engagement.

* * * * *